United States Patent
Ge

(10) Patent No.: US 8,254,074 B2
(45) Date of Patent: Aug. 28, 2012

(54) POWER CONTROL CIRCUIT

(75) Inventor: Ting Ge, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 185 days.

(21) Appl. No.: 12/790,974

(22) Filed: May 31, 2010

(65) Prior Publication Data

US 2011/0260542 A1    Oct. 27, 2011

(30) Foreign Application Priority Data

Apr. 26, 2010  (CN) .......................... 2010 1 0155851

(51) Int. Cl.
*H02H 3/18*    (2006.01)

(52) U.S. Cl. .......................................... 361/92; 361/79
(58) Field of Classification Search .................. 361/92, 361/79, 86
See application file for complete search history.

(56) References Cited

U.S. PATENT DOCUMENTS

2009/0290387 A1*  11/2009  Wheeler et al. ............ 363/21.01
* cited by examiner

*Primary Examiner* — Danny Nguyen
(74) *Attorney, Agent, or Firm* — Altis Law Group, Inc.

(57) ABSTRACT

A power control circuit includes a switch circuit, a current sampling circuit, a controller, and a standby power circuit. The switch circuit is connected to an alternating current (AC) power source and an electronic device. The sampling circuit is used to sample a current of a line of the AC power source. The controller is used to determine whether the sampled current is within a predetermined range, and turn off the switch circuit if the sampled current is within a predetermined range to disconnect the electronic device from the AC power source.

10 Claims, 3 Drawing Sheets

POWER CONTROL CIRCUIT

BACKGROUND

1. Technical Field

The present disclosure relates to control circuits and, particularly, to a power control circuit.

2. Description of Related Art

Power supplies are arranged at the back of computer cases. Plugging and unplugging the power cord before turning on or after turning off the computer is an inconvenience. Current may still flow from the AC power source to the power supply even after the computer is turned off. This is a waste of power.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar components. It should be noted that references to "an" or "one" embodiment in this disclosure are not necessarily to the same embodiment, and such references mean at least one.

Figure 1:
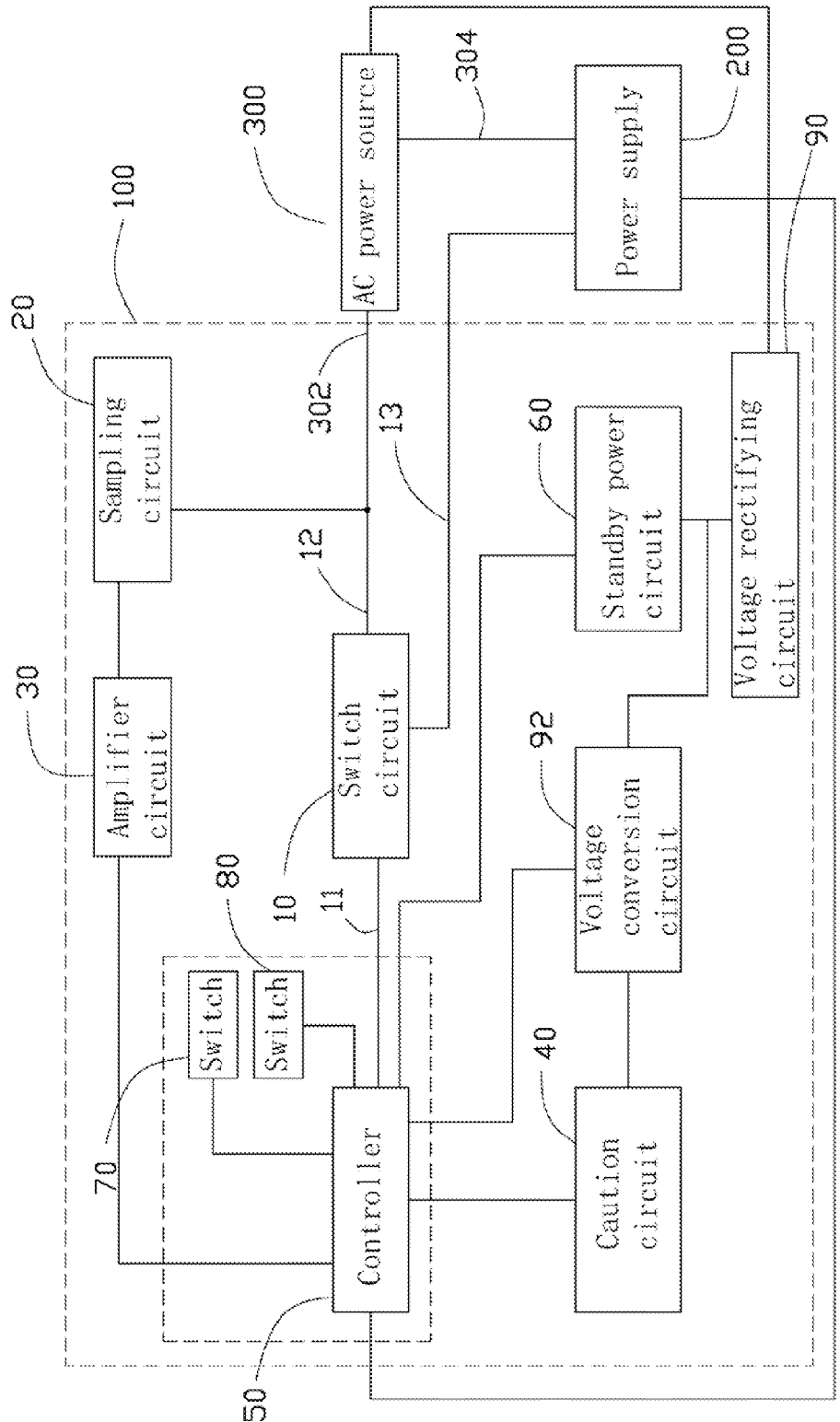
FIG. 1 is a block diagram of an exemplary embodiment of a power control circuit, the power control circuit including a switch circuit, a current sampling circuit, and a standby power circuit.

Referring to FIG. 1, an exemplary embodiment of a power control circuit 100 is assembled in an electronic device such as a computer to detect whether the computer is turned off, and automatically disconnect it from the power source when the computer is turned off. The power control circuit 100 includes a switch circuit 10, a sampling circuit 20, an amplifier circuit 30, a caution circuit 40, a controller 50, a standby power circuit 60, switches 70 and 80, a voltage rectifying circuit 90 and a voltage conversion circuit 92.

The switch circuit 10 is connected between a hot line 302 of an alternating current (AC) power source 300 and a power supply 200 of the computer. The power supply 200 is connected to a neutral line 304 of the AC power source 300. The power supply 200 is used to convert AC voltages into direct current (DC) voltages to power the computer.

The sampling circuit 20 is connected to the hot line 302 of the AC power source 300 and the amplifier circuit 30, to sample a current of the hot line 302, and output a sampling signal. The amplifier circuit 30 is connected between the sampling circuit 20 and the controller 50 to amplify the sampling signal and output the amplified sampling signal to the controller 50.

The controller 50 is connected to the switches 70 and 80. The switch 70 is used to start the controller 50 to execute a recording function. The recording function is capable of recording a minimum of the amplified sampling signal when the computer is turned off, and a predetermined range based on the minimum of the amplified sampling signal. In this embodiment, the predetermined range is from about 0 to about 110% of the minimum of the amplified sampling signal. The controller 50 is also used to determine whether the amplified sampling signal is within the predetermined range when the switch 80 is on. If the amplified sampling signal is within the predetermined range, the controller 50 determines the computer is turned off and turns off the switch circuit 10 to disconnect the power supply 200 from the AC power source 300. When the computer needs to be turned on after the computer is turned off, the switch 80 and a power-on switch (not shown) are turned on, the controller 50 controls the switch circuit to be turned on to connect the power supply 200 to the AC power source 300.

The standby power circuit 60 is connected to the AC power source 300 via the voltage rectifying circuit 90, and connected to the caution circuit 40 and the controller 50 via the voltage conversion circuit 92. The standby power circuit 60 is used to power the caution circuit 40 and the controller 50 when the AC power source 300 is not supplying power to the computer. The controller 50 is also used to detect a power of the standby power circuit 60, and start the caution circuit 40 when the power of the standby power circuit 60 is at a certain level.

Figure 2:
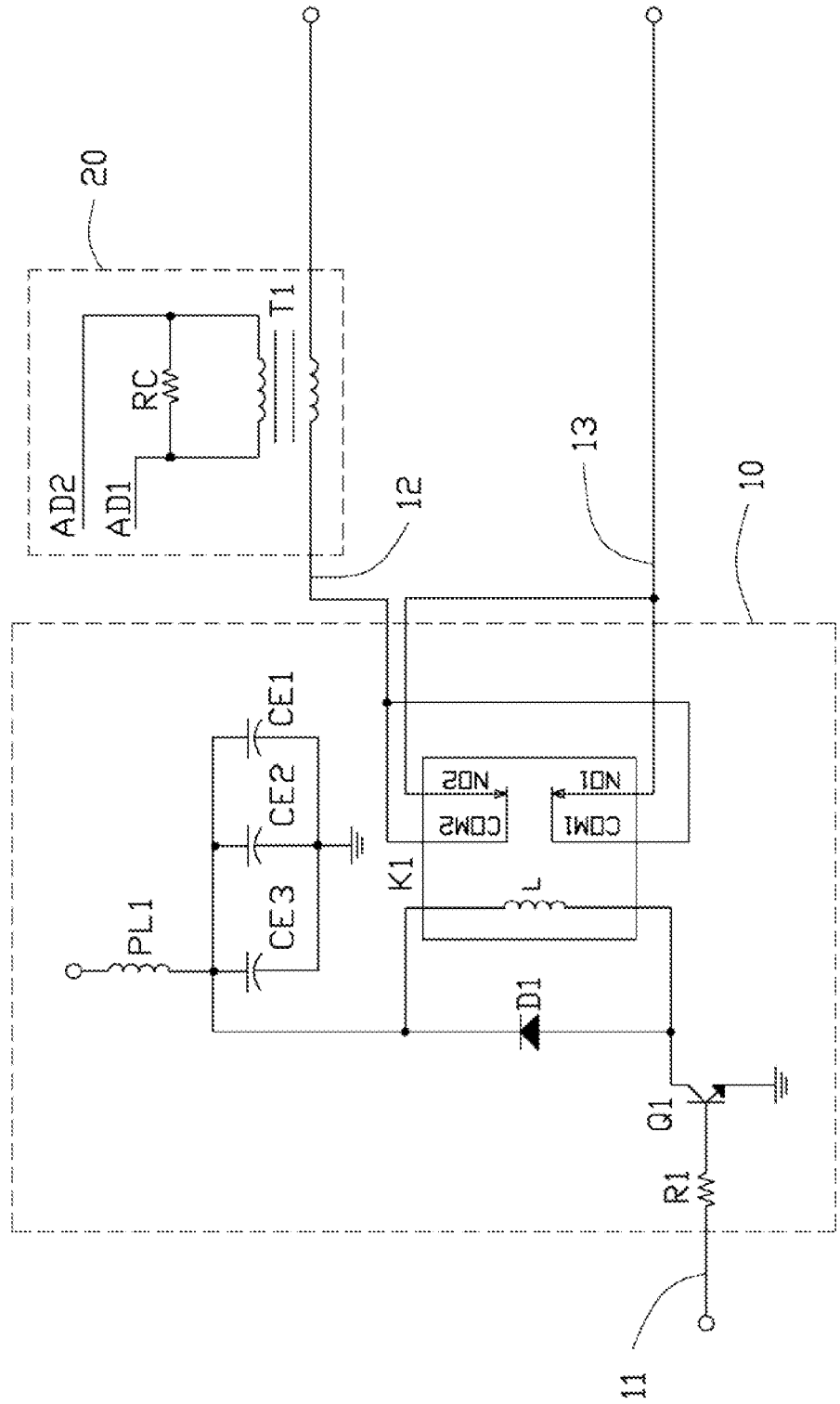
FIG. 2 is a circuit diagram of the switch circuit and the sampling circuit of FIG. 1.

Referring to FIG. 2, the switch circuit 10 includes an inductor PL1, a first capacitor CE1, a second capacitor CE2, a third capacitor CE3, a relay K1, a resistor R1, a first diode D1, and a transistor Q1. A first terminal of the inductor PL1 is connected to a 12V power source. A second terminal of the inductor PL1 is connected to a cathode of the first diode D1. Anodes of the first to third capacitors CE1-CE3 are connected to the cathode of the first diode D1. Cathodes of the first to third capacitor CE1-CE3 are grounded. The transistor Q is an NPN transistor. A collector of the first transistor Q1 is connected to an anode of the first diode D1. An emitter of the first transistor Q1 is grounded. A base of the first transistor Q1 is connected to a first terminal of the resistor R1. A second terminal of the resistor R1 is connected to the controller 50. The second terminal of the first resistor R1 is a control terminal 11 of the switch circuit 10. The relay K1 includes an inductor L, a COM1 terminal, a COM2 terminal, a NO1 terminal, a NO2 terminal, a voltage input terminal 12, and a voltage output terminal 13. A first terminal of the inductor L is connected to the anode of the first diode D1. A second terminal of the inductor L is connected to the cathode of the first diode D1. The voltage input terminal 12 is connected to the hot line 302 of the AC power source 300. The voltage output terminal 13 is connected to the power supply 200. When the computer is on, the control terminal 11 is at a high level and the relay K1 is in an on state. The transistor Q1 is on and there is a current passing through the inductor L. The COM1 terminal is connected to the NO1 terminal, and the COM2 terminal is connected to the NO2 terminal. The switch circuit 10 is on and the power supply 200 connects to the AC power source 300.

The sampling circuit 20 includes a transformer T1, a sampling resistor RC. The transformer T1 includes a primary coil and a secondary coil. The primary coil is connected to the hot line 302 of the AC power source 300. Thus, the current of the hot line 302 passes through the primary coil. The secondary coil is connected to the sampling resistor RC in parallel. Two terminals AD1 and AD2 of the resistor RC are connected to the amplifier circuit 30.

Figure 3:
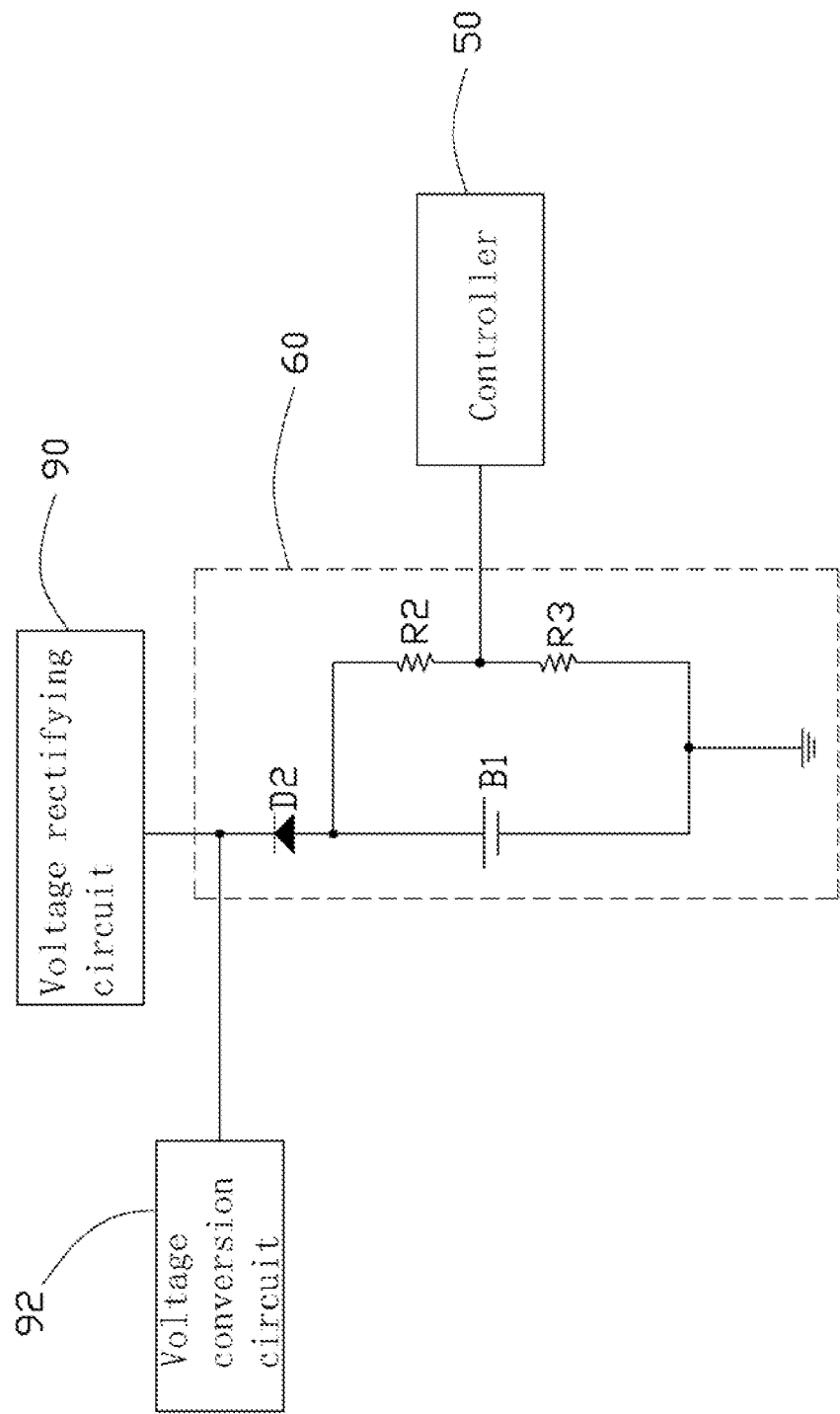
FIG. 3 is a circuit diagram of the standby power circuit of FIG. 1.

Referring FIG. 3, the standby power circuit 60 includes a battery B1, a second diode D2, and second and third resistors R2 and R3. An anode of the battery B1 is connected to an anode of the second diode D2. A cathode of the battery B1 is grounded. A cathode of the second diode D2 is connected to the voltage rectifying circuit 90 and the voltage conversion circuit 92. One terminal of the second resistor R2 is connected between the anode of the second diode D2 and the cathode of the battery B1. The other terminal of the second resistor R2 is connected to one terminal of the third resistor R3. The other terminal of the second resistor R3 is grounded. A node between the second and third resistor R2 and R3 is connected to the controller 50. Thus, the controller 50 is capable of detecting the power of the battery B1. When the AC power source 300 is supplying power to the computer, the voltage rectifying circuit 90 rectifies an AC voltage into a first DC voltage to supply to the cathode of the diode D2 and the voltage conversion circuit 92. The first DC voltage is greater than the voltage of battery B1. The second diode D2 is off. The standby power circuit 60 is idle. The voltage conversion circuit 92 converts the first DC voltage into a second DC voltage to power the controller 50 and the caution circuit 40. When the AC power source 300 is not supplying power to the computer, the voltage rectifying circuit 90 does not output the first voltage. The cathode of the diode D2 does not receive the first voltage and the second diode D2 is turned on. The battery B1 outputs a third voltage to the voltage conversion circuit 92 to convert the third voltage into the second voltage to power the caution circuit 40 and the controller 50.

Functions of the power control circuit 100 are described as followed. When the power supply 200 connects to the AC power source 300 and the computer is turned off, the switch 70 is turned on to start the controller 50 to execute the recording function to record the minimum of the amplified sampling signal. The controller 50 further obtains the predetermined range based on the minimum of the amplified sampling signal.

After the power supply 200 connects to the AC power source 300 and the computer is turned on, the switch 80 is turned on to detect whether the amplified sampling signal of the hot line 302 is within the predetermined range. Whenever the amplified sampling signal of the hot line 302 is within the predetermined range, the controller 50 determines the computer is turned off and outputs a low level signal to the control terminal 11 of the switch circuit 10 to turn off the transistor Q1. If there is not any current passing through the inductor L of the relay K1, the COM1 terminal is disconnected from the NO1 terminal, and the COM2 terminal is disconnected from the NO2 terminal The relay K1 is in an off state. The switch circuit 10 is off and the power supply 200 disconnects from the AC power source 300. When the computer needs to be powered on, the switch 80 is turned on. The controller 50 controls the relay K1 to be turned on. The power supply 200 is connected to the AC power source 300. The power-on switch needs to be turned on to start the computer. When the AC power source 300 is not supplying power to the computer, the anode of the second diode D2 is at a low level. The battery B1 powers the caution circuit 40 and the controller 50 via the voltage conversion circuit 92. The controller 50 is used to detect power of the battery B1. When the power of the battery B1 is at a certain level, the controller 50 starts the caution circuit 40 to give an alarm.

If the amplified sampling signal of the hot line 302 is not within the predetermined range, the controller 50 determines the computer is on and keeps the control terminal 11 of the switch circuit 10 at the high level signal. The relay K1 keeps in the on state. The switch circuit 10 is on and the power supply 200 connects to the AC power source 300.

It is to be understood, however, that even though numerous characteristics and advantages of the present disclosure have been set forth in the foregoing description, together with details of the structure and function of the disclosure, the disclosure is illustrative only, and changes may be made in details, especially in matters of shape, size, and arrangement of parts within the principles of the disclosure to the full extent indicated by the broad general meaning of the terms in which the appended claims are expressed.

What is claimed is:

1. A power control circuit to disconnect a power supply of an electronic device from an alternating current (AC) power source when the electronic device is turned off, the power control circuit comprising:

a switch circuit connected to the AC power source and the power supply of the electronic device;

a sampling circuit connected to a line of the AC power source to sample current of the line of the AC power source and output a sampling signal; and a controller connected to the sampling circuit and the switch circuit to determine whether the sampling signal is within a predetermined range, and turn off the switch circuit if the sampling signal is within the predetermined range to disconnect the power supply from the AC power source;

wherein if the sampling signal is not within the predetermined range, the controller turns on the switch circuit to connect the power supply of the electronic device to the AC power source, the switch circuit comprises an NPN transistor and a relay, an emitter of the transistor is grounded, a base of the transistor is connected to the controller, a collector of the transistor is connected to the relay, and the relay is connected between the power supply of the electronic device and the AC power source; when the transistor is turned off, the relay and the switch circuit are turned off, and the AC power source is disconnected from the power supply of the electronic device; when the transistor is turned on, the relay and the switch circuit are turned on, and the power supply of the electronic device is connected to the AC power source.

2. The power control circuit of claim 1, further comprising an amplifier circuit connected between the sampling circuit and the controller, the sampling circuit comprising a transformer, a sampling resistor, the transformer comprising a primary coil connected to the line of the AC power source and a secondary coil connected to the sampling resistor in parallel, two terminals of the sampling resistor are connected to the amplifier circuit to output the sampling signal to the amplifier circuit to be amplified.

3. The power control circuit of claim 1, further comprising a standby power circuit, a voltage rectifying circuit connected between the AC power source and the standby power circuit to rectify an AC voltage into a first direct current (DC) voltage to make the standby power circuit be idle when the AC power source is supplying power to the electronic device, and a voltage conversion circuit connected between the standby power circuit and the controller to convert a second DC voltage from the standby power circuit into a third voltage to power the controller when the AC power source is not supplying power to the electronic device, the voltage conversion circuit is also connected to the voltage rectifying circuit to convert the first voltage from the voltage rectifying circuit into the third voltage to power the controller when the AC power source is supplying power to the electronic device.

4. The power control circuit of claim 3, further comprising a caution circuit connected between the controller and the voltage conversion circuit, the standby power circuit comprises a battery, a diode, and a first and second resistor, an anode of the battery is connected to an anode of the second diode, a cathode of the battery is grounded, a cathode of the diode is connected to the voltage rectifying circuit and the voltage conversion circuit, one terminal of the first resistor is connected between the anode of the second diode and the cathode of the battery, the other terminal of the first resistor is connected to one terminal of the second resistor, the other terminal of the second resistor is grounded, a node between the first and second resistor is connected to the controller, when the power of the battery is at a certain level, the controller start the caution circuit, when the AC power source is supplying power to the electronic device, the voltage conversion circuit converts the first voltage from the voltage rectifying circuit into the third voltage to power the caution circuit, when the AC power source is not supplying power to the electronic device, the voltage conversion circuit converts the second voltage from the battery into the third voltage to power the caution circuit.

5. A power control circuit to disconnect a power supply from an alternating current (AC) power source when an electronic device powered by the power supply is turned off, the power control circuit comprising:
  a switch circuit connected to the AC power source and the power supply;
  a sampling circuit connected to the AC power source to monitor the flow of the line current from the AC power source to the power supply and output a sampling signal; and
  a controller connected to the sampling circuit and the switch circuit to disconnect the power supply from the AC power source if the sampling signal is at a predetermined range;
  if the sampling signal is not within the predetermined range, the controller turns on the switch circuit to connect the power supply of the electronic device to the AC power source, the switch circuit comprises an NPN transistor and a relay, an emitter of the transistor is grounded, a base of the transistor is connected to the controller, a collector of the transistor is connected to the relay, and the relay is connected between the power supply of the electronic device and the AC power source; when the transistor is turned off, the relay and the switch circuit are turned off, and the AC power source is disconnected from the power supply of the electronic device; when the transistor is turned on, the relay and the switch circuit are turned on, and the power supply of the electronic device is connected to the AC power source.

6. The power control circuit of claim 5, further comprising an amplifier circuit connected between the sampling circuit and the controller, the sampling circuit comprising a transformer, a sampling resistor, the transformer comprising a primary coil connected to a line of the AC power source to monitor the flow of the line current from the AC power source and a secondary coil connected to the sampling resistor in parallel, two terminals of the sampling resistor are connected to the amplifier circuit to output the sampling signal to the amplifier circuit to be amplified.

7. The power control circuit of claim 5, further comprising a standby power circuit, a voltage rectifying circuit connected between the AC power source and the standby power circuit to rectifies an AC voltage into a first direct current (DC) voltage to make the standby power circuit be idle when the AC power source is supplying power to the electronic device, and a voltage conversion circuit connected between the standby power circuit and the controller to convert a second DC voltage from the standby power circuit into a third voltage to power the controller, the voltage conversion circuit is also connected to the voltage rectifying circuit to converts the first voltage from the voltage rectifying circuit into the third voltage to power the controller when the AC power source is supplying power to the electronic device.

8. The power control circuit of claim 7, further comprising a caution circuit connected between the controller and the voltage conversion circuit, the standby power circuit comprises a battery, a diode, and a first and second resistor, an anode of the battery is connected to an anode of the second diode, a cathode of the battery is grounded, a cathode of the diode is connected to the voltage rectifying circuit and the voltage conversion circuit, one terminal of the first resistor is connected between the anode of the second diode and the cathode of the battery, the other terminal of the first resistor is connected to one terminal of the second resistor, the other terminal of the second resistor is grounded, a node between the first and second resistor is connected to the controller, when the power of the battery is at a certain level, the controller start the caution circuit.

9. A power control circuit to disconnect a power supply of an electronic device from an alternating current (AC) power source when the electronic device is turned off, the power control circuit comprising:
  a switch circuit connected to the AC power source and the power supply of the electronic device;
  a sampling circuit connected to a line of the AC power source to sample current of the line of the AC power source and output a sampling signal;
  a controller connected to the sampling circuit and the switch circuit to determine whether the sampling signal is within a predetermined range, and turn off the switch circuit if the sampling signal is within the predetermined range to disconnect the power supply from the AC power source; and
  a standby power circuit, a voltage rectifying circuit connected between the AC power source and the standby power circuit to rectify an AC voltage into a first direct current (DC) voltage to make the standby power circuit be idle when the AC power source is supplying power to the electronic device, and a voltage conversion circuit connected between the standby power circuit and the controller to convert a second DC voltage from the standby power circuit into a third voltage to power the controller when the AC power source is not supplying power to the electronic device, the voltage conversion circuit is also connected to the voltage rectifying circuit to convert the first voltage from the voltage rectifying circuit into the third voltage to power the controller when the AC power source is supplying power to the electronic device.

10. The power control circuit of claim 9, further comprising a caution circuit connected between the controller and the voltage conversion circuit, the standby power circuit comprises a battery, a diode, and a first and second resistor, an anode of the battery is connected to an anode of the second diode, a cathode of the battery is grounded, a cathode of the diode is connected to the voltage rectifying circuit and the voltage conversion circuit, one terminal of the first resistor is connected between the anode of the second diode and the cathode of the battery, the other terminal of the first resistor is connected to one terminal of the second resistor, the other terminal of the second resistor is grounded, a node between the first and second resistor is connected to the controller, when the power of the battery is at a certain level, the controller start the caution circuit, when the AC power source is supplying power to the electronic device, the voltage conversion circuit converts the first voltage from the voltage rectifying circuit into the third voltage to power the caution circuit, when the AC power source is not supplying power to the electronic device, the voltage conversion circuit converts the second voltage from the battery into the third voltage to power the caution circuit.

* * * * *